United States Patent [19]
Pritchard et al.

[11] Patent Number: 5,707,157
[45] Date of Patent: Jan. 13, 1998

[54] BEARING RETENTION MECHANISM

[75] Inventors: Larry A. Pritchard, Sterling Heights; John R. Forsyth, Romeo, both of Mich.

[73] Assignee: New Venture Gear, Inc., Troy, Mich.

[21] Appl. No.: 693,734

[22] Filed: Aug. 7, 1996

[51] Int. Cl.⁶ ................................................ F16C 19/06
[52] U.S. Cl. ............................................................ 384/542
[58] Field of Search ............................... 384/542, 584, 384/537, 585, 490

[56] References Cited

U.S. PATENT DOCUMENTS

| | | | |
|---|---|---|---|
| 3,469,897 | 9/1969 | Rike | 384/542 |
| 3,506,317 | 4/1970 | Deangeli | 384/542 |
| 5,284,068 | 2/1994 | Frost . | |
| 5,443,426 | 8/1995 | Frost . | |

Primary Examiner—Lenard A. Footland
Attorney, Agent, or Firm—Harness, Dickey & Pierce, P.L.C.

[57] ABSTRACT

A bearing retention system for use in mounting a bearing assembly. The bearing retention system includes a retainer stud having an elongated head that is used to axially restrain a race of the bearing assembly and a locknut that is used to tighten the retainer stud.

9 Claims, 2 Drawing Sheets

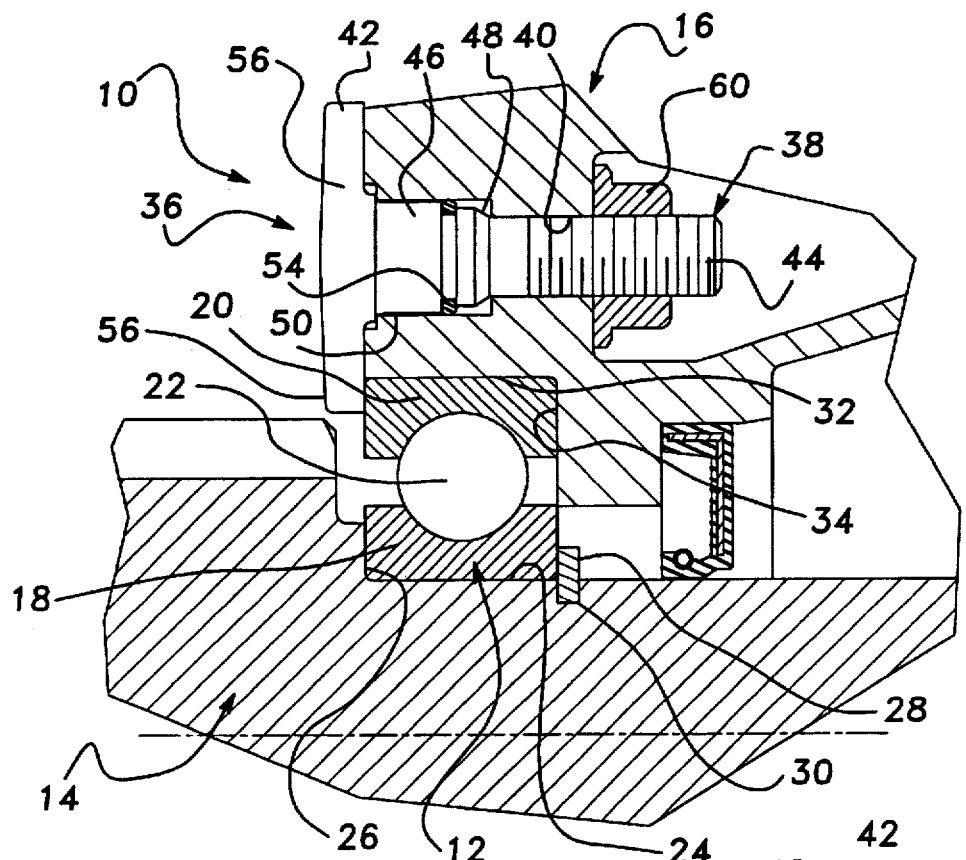
_Fig-1_
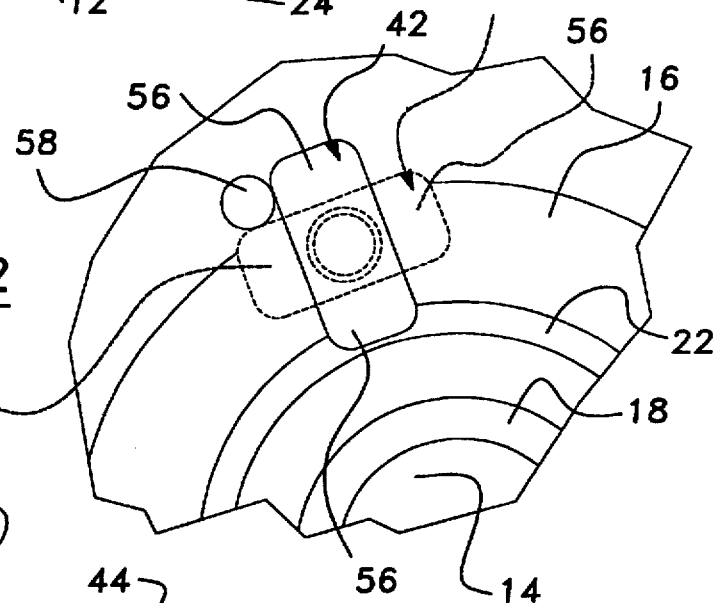
_Fig-2_
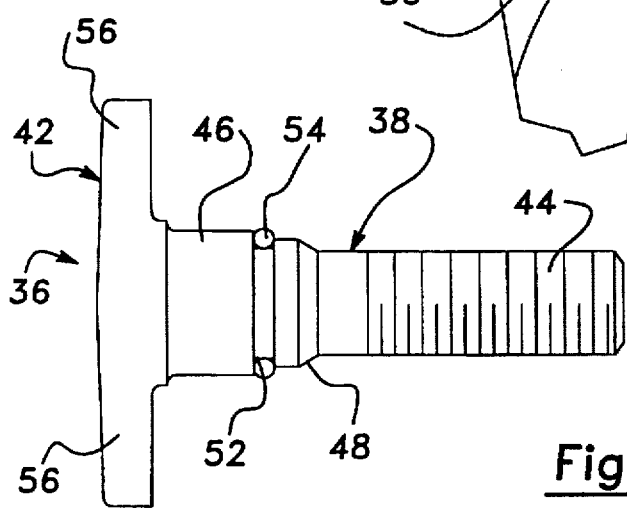
_Fig-3_

BEARING RETENTION MECHANISM

BACKGROUND OF THE INVENTION

The present invention relates generally to bearings and, more specifically, to a retention mechanism for mounting a bearing assembly between a shaft and a housing.

As is known, bearing assemblies are used to support a first component (i.e., a shaft) for rotation relative to a second component (i.e., a housing). Typical bearing assemblies include an inner race fixed to one of the components, an outer race fixed to the other component, and a plurality of rolling contact elements (i.e., balls, rollers, etc.) retained therebetween. To maintain proper axial alignment of the bearing assembly, the inner and outer races are commonly retained against a shoulder formed on the corresponding component by a snap ring, a locknut, or a retainer plate. While such conventional bearing retention arrangements are widely used, they have assembly requirements which tend to be labor intensive.

SUMMARY OF THE INVENTION

Accordingly, the present invention is an improvement over conventional bearing retention systems which aids in more efficient installation of the bearing assembly.

Specifically, the present invention is directed to a bearing retention mechanism including a retainer stud having a threaded shank and an elongated head used to retain one of the bearing races, and a locknut fastened to the threaded shank for applying the necessary clamping torque to the stud. The elongated head is rotated to a first (i.e., "pre-assembly") position during installation of the bearing assembly. Thereafter, when the bearing assembly is properly seated, the elongated head can then be rotated to a second (i.e., "post-assembly") position whereat it overlies the bearing race and, thus, holds the bearing assembly in place. The locknut is then tightened to apply the requisite clamping torque on the stud. Finally, a raised boss is provided to properly orient the stud head in its second position, thus ensuring proper alignment.

The bearing retention mechanism of the present invention also includes an O-ring that seals the retainer stud in a fluid-tight manner relative to the component to which it is mounted.

BRIEF DESCRIPTION OF THE DRAWINGS

The various advantages of the present invention will become apparent to those skilled in the art after studying the following specification and by reference to the drawings in which:

FIG. 1 is a partial sectional view depicting a bearing retention mechanism according to a preferred embodiment of the present invention;

FIG. 2 is an end view showing the position of the stud retainer with respect to both the bearing assembly and the raised boss;

FIG. 3 is an enlarged side view of the retainer stud with an O-ring seal installed thereon;

DETAILED DESCRIPTION OF THE PREFERRED EMBODIMENT

Figure 4:
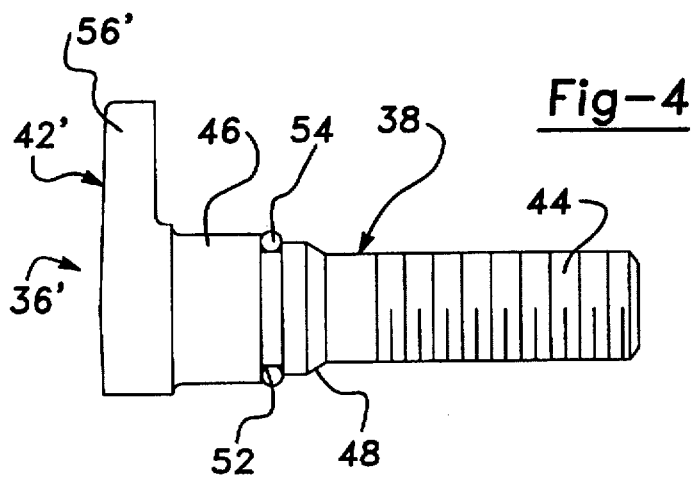
FIG. 4 is an enlarged side view of the retainer stud according to an alternative preferred embodiment of the present invention.

With reference to the drawings, a bearing retention mechanism 10 for retaining a bearing assembly 12 between two components is disclosed. In the embodiment shown, the two components include a shaft 14 and a housing 16, with shaft 14 supported by bearing assembly 12 for rotation in housing 16. As will be appreciated, shaft 14 and housing 16 are merely exemplary of the type of components used with bearing retention mechanism 10 for securing bearing assembly 12 therebetween.

As best seen from FIG. 1, bearing assembly 12 includes an inner race 18, an outer race 20, and a plurality (one shown) of rolling contact elements, such as ball 22. Inner race 18 is mounted on an outer surface 24 of shaft 14 and is seated against a radial thrust surface thereof which defines a shoulder 26. A snap ring 28 is retained in a groove 30 formed in shaft 14 to axially restrain inner race 18 in abutting engagement with shoulder 26. Alternatively, shoulder 26 could be replaced with a second snap ring retained in a second groove in shaft 12 for axially locating inner race 18 between the pair of snap rings. Outer race 20 is mounted in an aperture in housing 16 defined by an axial surface 32 and a radial thrust surface which defines a shoulder 34.

To provide means for axially restraining outer race 20 against housing 16, retention mechanism 10 includes a retainer stud 36 having a cylindrical shank 38 adapted for installation in a bore 40 formed in housing 16, and an elongated head 42. Shank 38 includes a threaded segment 44 and a non-threaded segment 46 having a larger diameter than threaded segment 44. As such, a tapered transition surface 48 is formed therebetween that is adapted to seat against a similarly contoured counterbore 50 in bore 40. A circumferential groove 52 is formed in non-threaded segment 46 and is adapted to retain a resilient O-ring 54 therein for sealing against bore 40 in housing 16. Head 42 of retainer stud 36 is symmetrical and is generally rectangular in shape and includes tapered end segments 56. As seen in FIG. 1, one of end segments 56 is positioned to extend past and overly a portion of the adjacent lateral edge of outer race 20, whereby outer race 20 is axially restrained in abutting engagement with shoulder 34 of housing 16. In FIG. 2, head 42 is shown in phantom lines rotated to a "preassembly" position whereat its end segments 56 will not interfere with outer race 20 of bearing assembly 12 being properly seated during assembly of shaft 14 in housing 16. In contrast, the solid lines illustrate head 42 rotated to a "post-assembly" position whereat one end segment 56 extends over outer race 20. A raised boss or post 58 extending from housing 16 is shown abutting the opposite end segment 56 of head 42 for ensuring proper alignment thereof in its post assembly position. A locknut 60 is shown threadably secured to threaded segment 44 of shank 38. In operation, locknut 60 is tightened after movement of head 42 to its post assembly position to torque retainer stud 36 and secure outer race 20.

In operation, shank 38 is inserted into bore 40 and locknut 60 is secured to its threaded segment 44 for holding head 42 in its pre-assembly position. Following installation of shaft 14, with bearing assembly 12 already secured thereto, outer race 20 is seated against shoulder 34 and head 42 is rotated to its post-assembly position. Thereafter, locknut 60 is tightened to exert a desired torque on retainer stud 36. In this manner, assembly is made easier with less components to significantly simplify the overall assembly process for installing a bearing assembly.

Figure 5:
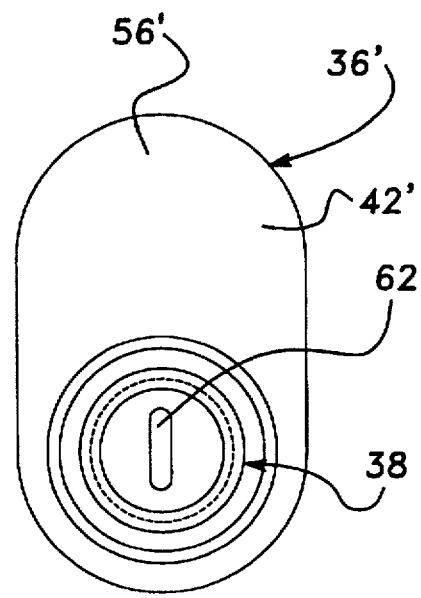
FIG. 5 is an end view of FIG. 4.
Figure 6:
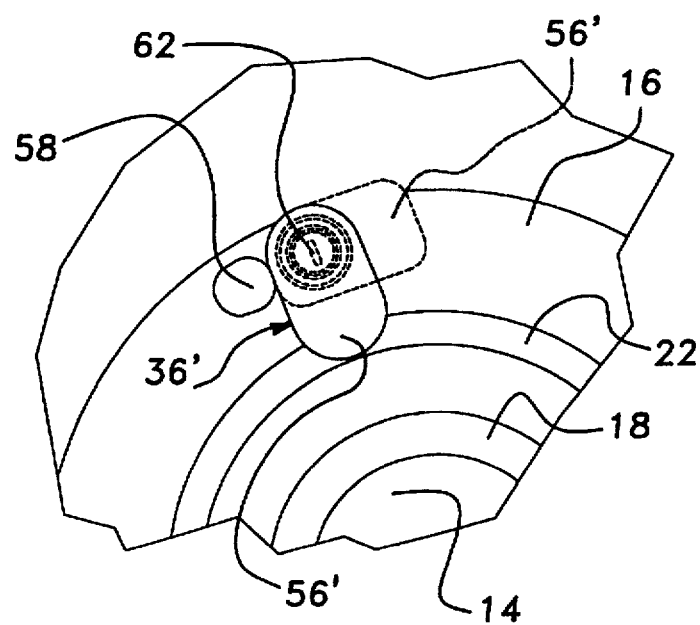
FIG. 6 is a view, similar to FIG. 2, showing the stud retainer of FIG. 4 used therein.

Referring to FIGS. 4 through 6, bearing retention mechanism 10 is shown to include a modified retainer stud 36' which is generally similar in function and structure to retainer stud 36 with the exception that its head 42' has only one end segment 56'. Due to this similarity, the segments of retainer stud 36' that are identical to those previously described are identified by common reference numerals while any modified structure is identified by a primed reference numeral. In addition to the modified structure of head 42' of retainer stud 36', FIG. 5 specifically shows an alignment mark, denoted by a slot 62, formed in the terminal end of shank 38 which is useful for verifying correct location of head 42' in its post-assembly position. As shown in FIG. 6, slot 62 is aligned to be pointing radially relative to shaft 14 when stud 36' has been rotated to its post-assembly position abutting post 58. The pre-assembly position of end segment 56' is shown by phantom lines to illustrate its positioning so as not to interfere with installation of bearing assembly 12. Provisions for a visual indicator, such as slot 62, increase reliability in proper positioning of end segment 56' in its post-assembly position following installation of bearing assembly 12.

The foregoing discussion discloses and describes exemplary embodiments of the present invention. One skilled in the art will readily recognize from such discussion, and from the accompanying drawings and claims, that various changes, modifications and variations can be made therein without departing from the true spirit and fair scope of the invention as defined in the following claims.

What is claimed is:

1. A bearing retention mechanism comprising:
   a first component;
   a second component;
   a bearing assembly arranged to permit relative rotation between said first and second components, said bearing assembly including an inner race fixed to said first component, an outer race, and a plurality of rolling contact elements rollingly disposed between said inner and outer races; and
   a retainer stud having a shank extending through a bore in said second component and an elongated head for engaging said outer race so as to fix said outer race to said second component.

2. The bearing retention mechanism of claim 1 wherein said first component is a shaft and said second component is a housing with said bearing assembly arranged to support said shaft for rotation in said housing.

3. The bearing retention mechanism of claim 1 wherein said shank of said retainer stud has a threaded segment extending partially out of said bore, and said bearing retention mechanism further comprises a locknut for engaging said threaded segment of said shank to tighten said retainer stud relative to said second component.

4. The bearing retention mechanism of claim 1 wherein said shank of said retainer stud includes a circumferential groove that receives an O-ring seal therein for sealing against said bore.

5. The bearing retention mechanism of claim 1 wherein said head of said retainer stud is movable between a first position disengaged from said outer race and a second position overlying and engaging said outer race.

6. The bearing retention mechanism of claim 5 further comprising a post extending from said second component for locating said head of said retainer stud in said second position.

7. The bearing retention mechanism of claim 1 wherein said outer race has a first lateral surface located adjacent a shoulder formed in said second component and a second lateral surface engaged by said head of said retainer stud.

8. The bearing retention mechanism of claim 1, wherein said elongated head includes at least one radially extending end segment.

9. The bearing retention mechanism of claim 8, wherein said retainer stud includes a slot formed in a terminal end of said shank for verifying correct location of said elongated head in a post-assembly position.

* * * * *